Patented Jan. 10, 1928.

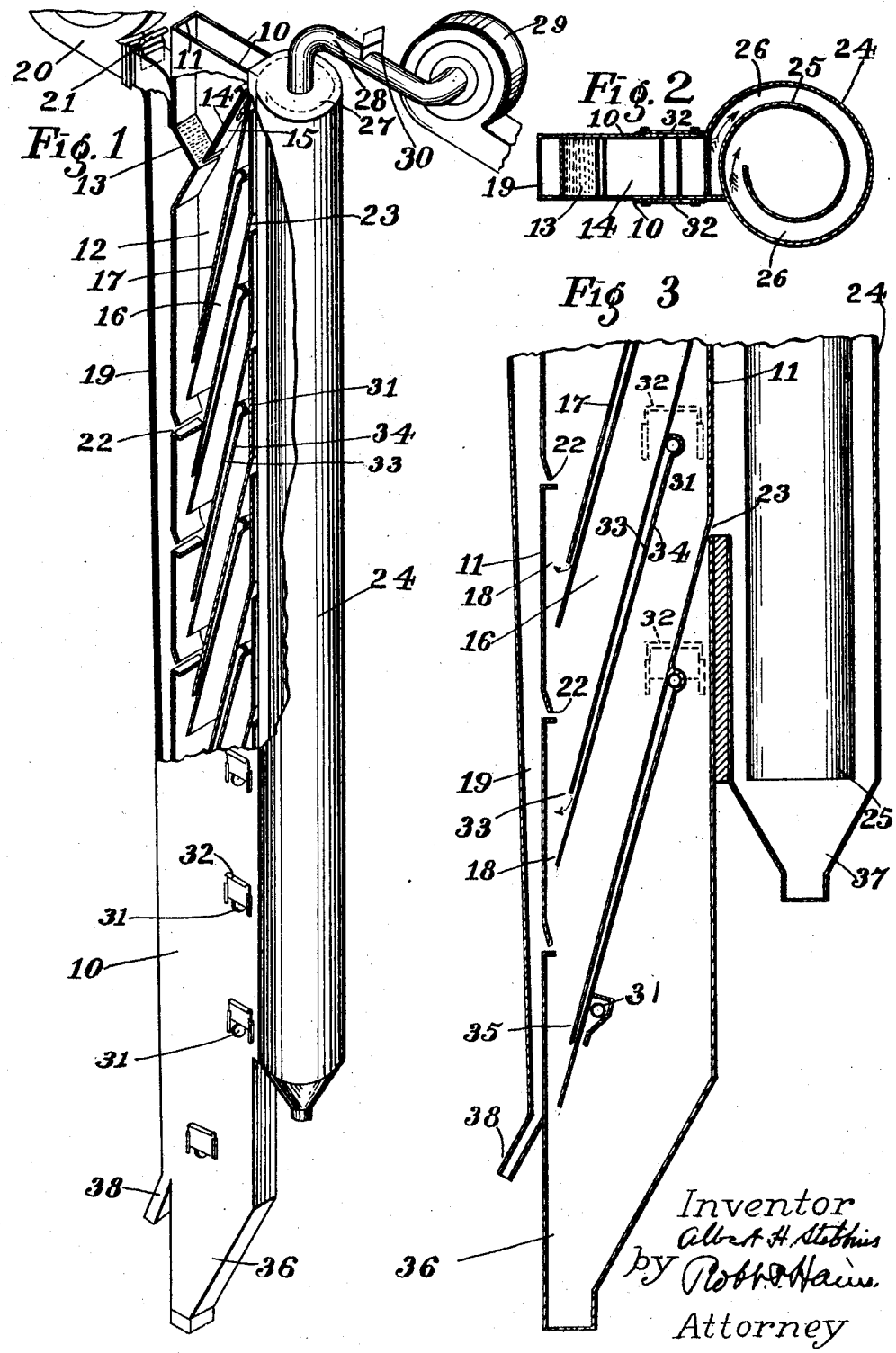

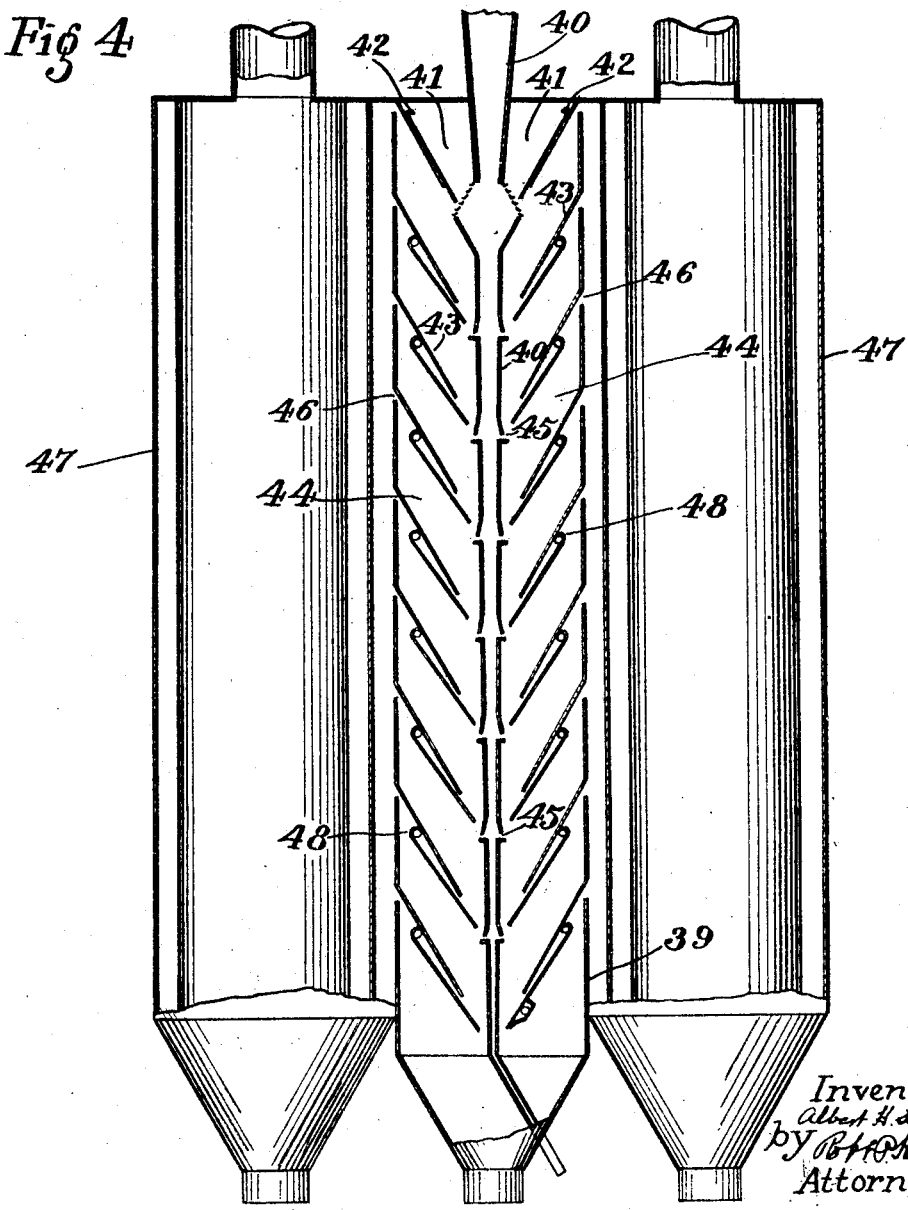

1,655,574

UNITED STATES PATENT OFFICE.

ALBERT H. STEBBINS, OF LOS ANGELES, CALIFORNIA.

CLASSIFIER.

Application filed November 24, 1926. Serial No. 150,439.

This invention relates to classifiers of the type in which the materials passing downwardly within a treatment chamber under the influence of gravity are subjected to the action of air currents that remove the finer particles from the path of the falling materials.

In employing classifiers of this general type it is difficult to secure a thorough treatment through the use of an air blast alone, or through an air exhaust alone, and if the materials being treated are relatively fine it is necessary to subject them to repeated treatments in order to remove completely the fine particles from the coarser materials.

The present invention therefore contemplates a classifier constructed to employ both an air blast and air exhaust means in effecting the separation of the material, and which is also constructed to subject the materials to a number of successive treatments as they pass downwardly within the treatment chamber.

One of the features of the present invention resides in adjustable means for controlling the strength of the air blast and the strength of the air suction within the treatment chamber so that the force of either the blast or suction may be varied with respect to the other to vary the separating action within the treatment chamber, and a further feature resides in adjustable means for admitting air from the atmosphere into the treatment chamber to regulate the pressure therein and to assist in effecting the desired separation.

Another feature of the invention resides in a relatively long upstanding classifier having a series of inclined plates mounted in the treatment chamber to divide the same into a multiplicity of settling compartments arranged one above the other and into which the materials are carried by the air, and a further feature resides in means for extracting from the upper portion of the compartments the fine particles that remain suspended in the air.

Still another feature of the invention resides in a suction dust extractor extending lengthwise of the treatment chamber to extract air from the treatment chamber at various points lengthwise of the chamber, and in means for imparting a whirling movement to the air within the dust extractor to effect a centrifugal separation of the materials.

Other features of the invention and novel combination of parts in addition to the above will be hereinafter described in connection with the accompanying drawings which illustrate good practical forms of the invention.

In the drawings:—

Fig. 1 is a perspective view of a multiple treatment classifier constructed in accordance with the present invention;

Fig. 2 is a transverse sectional view through the classifier of Fig. 1;

Fig. 3 on an enlarged scale is a vertical sectional view through the lower portion of the classifier of Fig. 1;

Fig. 4 is a vertical sectional view through a modified type of classifier; and

Fig. 5 is a top plan view of the construction shown in Fig. 4.

The casing of the classifier in which the materials are treated is supported in an upright position and is preferably made relatively long and narrow, as shown in the drawings, and the length of the casing will depend largely upon the size of the materials to be treated. If the classifier is designed to treat relatively coarse particles then the desired separation of the materials can be effected by retreating the materials a relatively few times, but if the materials being treated are in a fine dust-like condition, then it may be desirable to subject them to a large number of retreatments, say forty or more, in which case a classifier for effecting this large number of retreatments will necessarily be much longer than a classifier which effects only a few retreatments.

The casing of the classifier may conveniently be formed of sheet metal and is shown in the drawing as being rectangular in cross section and as having the vertical side walls 10 and the vertical end walls 11. Within the casing thus formed is provided the treatment chamber 12 which extends throughout substantially the entire length of the casing. A feed hopper is provided near the upper end of the casing and in the construction shown this feed hopper is formed by providing near the upper end of the casing the inclined wall 13 which projects inwardly from one of the end walls 11 into the casing, and this plate 13 is preferably provided with air apertures through which air may enter the feed hopper from the blast pipe to be described. The rate at which the materials are delivered into the treatment chamber 12 by the feed hopper may be controlled by adjusting the sliding gate 14 which is slidably mounted upon an inclined wall 15 of the feed hopper. The passage of the air upwardly through the apertures in the floor plate 13 of the feed hopper will prevent the materials from clogging at the feeding point.

The materials delivered into the treatment chamber by the feed hopper move downwardly therein under the influence of gravity and as they progress downwardly within this chamber they are subjected to any desired number of air treatments effected by forcing air through the falling materials to cause the air to extract the finer particles from the heavier materials moving downwardly within the casing.

One of the features of the present invention resides in the construction whereby the treatment chamber is divided into any desired number of settling compartments, and in the construction shown the settling compartments 16 are formed within the chamber 12 by mounting within the chamber the downwardly inclined plates 17 which are supported in spaced relation to each other. The angle at which these plates are inclined will vary with the type of materials being treated in the classifier.

If the materials are extremely fine they will tend to rest upon the inclined plates 17 without sliding down the same, and to prevent the materials from lodging upon the plates and sticking thereto it will be necessary to give the plates a steep inclination, as shown in Figs. 1 and 3 of the drawing. If the materials being treated are relatively coarse they will have less tendency to rest upon the inclined plates 17, and in this case the inclination of these plates may be made much less than as shown in Figs. 1 and 3.

The plates 17 are shown in Figs. 1 and 3 of the drawings as having their upper ends secured to the right-hand end wall 11, and the lower ends of these plates lie relatively close to the left-hand end wall 11 of the casing so that a restricted throat 18 is formed between the wall 11 and the lower end of each plate 17. As a result of this construction the heavier materials that settle in each compartment 16 will be directed through a throat 18 as they slide downwardly upon the inclined plate, and in this manner the materials moving downwardly within the treatment chamber 12 are directed against the vertical end wall 11 along which is disposed the air blast pipe 19. Air may be supplied to this pipe 19 by a blast fan 20 and the amount of air supplied to the classifier by the pipe 19 may be controlled by adjusting the sliding gate 21.

The separation of the materials moving downwardly within the chamber 12 is effected by directing jets of air against the falling materials so that the materials will be carried into the settling compartments 16, and to this end air discharge openings 22 are formed in the end wall 11 of the casing and through which jets of air are forced from the blast pipe 19. The arrangement is such that one air blast nozzle 22 is provided near the lower end of each compartment 16 and as the materials escape through the throat 18 of one settling compartment they will be directed downwardly into the path of the next nozzle 22 to be blown upwardly into the adjacent compartment for retreatment. In this manner the materials are treated over and over again as they pass downwardly within the classifier.

The lighter particles which remain suspended in the air within a compartment are removed from the upper portion of the compartment and to this end each compartment 16 has a discharge opening 23 provided at its upper end and through which air is drawn by the exhaust means to be described.

While various means might be provided for removing air from the different compartments 16 through the openings 23, it is desirable to subject the materials that escape through these openings to a further treatment, and to this end, in accordance with the present invention, a suction dust extractor 24 is provided which extends lengthwise of the treatment chamber 12. This dust extractor may be approximately cylindrical in shape and is constructed to effect a separation of the materials therein by imparting a whirling movement to the materials as they pass from the discharge openings 23 into the central portion of the dust extractor 4. This separating effect is secured by providing within the suction dust extractor the spirally wound inner wall 25 which serves to form the spiral air passage 26 between the inner wall 25 and outer wall 24. The whirling movement imparted to the particles within the casing 24 will throw the heavier particles outwardly by centrifugal force and this will facilitate their settling therein, while the lighter particles which reach the central portion of the dust extractor are removed through the upper end 27 of the dust extractor. This is accomplished by providing the air exhaust pipe 28 which leads from the upper end of the casing 24 to an exhaust fan 29. The amount of air exhausted from the dust extractor may be controlled by adjusting the sliding gate 30.

As a result of the construction so far described it will be seen that the strength of the air blast employed in effecting the desired treatment of the materials may be varied as desired by adjusting the gate 21, and that the strength of the suction means may be regulated as desired by adjusting the sliding gate 30. If the adjustment of the gates 21 and 30 should be such that the volume of air removed from the classifier by the exhaust means exceeds the volume of air supplied to the classifier by the air blast means, then the pressure of the air within the treatment chamber 12 will be reduced. It may therefore be desirable to introduce air into the chamber 12 from the atmosphere to increase the air pressure within the chamber, and this is accomplished in the embodiment of the invention shown by providing the transversely extending air inlet pipe 31 the ends of which extend through the side walls 10 of the casing, and the amount of air permitted to enter each of these transversely extending pipes may be controlled by adjusting the sliding gates 32 provided at each side of the casing. It is desirable to introduce the air from the atmosphere into the treatment chamber at a point adjacent the lower end of the inclined plates 17 so that the rising air currents thus produced will help to remove the finer particles sliding downwardly along an inclined plate 17. To this end in the construction shown a narrow air inlet passage 33 is provided along the under face of each plate 17 by mounting adjacent each plate a second plate 34 which extends downwardly from an air inlet pipe 31 to a point beyond the lower end of its adjacent plate 17, as will be apparent from the drawings. Some of the air introduced into the casing through the passage 33 may pass upwardly through the apertures 35 formed adjacent the lower end of an inclined plate 17, while the rest of the air may pass upwardly around the lower end of the plate 17, as indicated by the arrows.

As a result of the construction described it will be seen that the materials passing downwardly within the treatment chamber 12 are repeatedly subjected to the action of the air delivered by the nozzles 22, and also to the action of the air passing upwardly around the lower end of each inclined plate 17. The heavier materials that travel downwardly throughout the entire length of the casing are collected in the hopper 36 from which they may be extracted from time to time, as found desirable. The particles that settle in the lower end of the suction dust extractor 24 are collected in the hopper 37 at the lower end thereof. The blast pipe 19 may be provided with a discharge opening 38 at its lower end, which is normally closed but may be opened from time to time to blow out this pipe.

In the modified construction shown in Figs. 4 and 5 the material treatment chamber 39 is provided with the air blast pipe 40 which extends downwardly within the central portion of the treatment casing, and the materials are delivered into the treatment chambers at each side of the pipe 40 by the feed hoppers 41 having the sliding gates 42 for controlling the rate of feed. At each side of the blast pipe 40 are provided the inclined plates 43 which may be similar to the plates 17 above mentioned and serve to divide the material treatment chamber into the settling compartments 44. Air is directed into each of these compartments from the blast pipe 40 through a nozzle 45, and air is removed from the upper end of each of these compartments through the discharge opening 46. Air is exhausted from the series of discharge openings 46 at one side of the casing by a suction dust extractor 47 similar to that above described, and air is exhausted from the openings 46 at the opposite side of the casing by a similar dust extractor 47. Air from the atmosphere is introduced into the treatment chamber through the air inlet pipes 48, and the amount of air which is permitted to enter these pipes may be controlled by adjusting the sliding gates 49.

From the foregoing description when read in connection with the drawings it will be seen that in the construction shown in Figs. 1, 2 and 3 and also in the modified construction shown in Figs. 4 and 5, the materials passing downwardly within the treatment chamber are carried time and time again into the settling compartments by the air, and that the lighter particles which remain suspended within the air are removed from these compartments, while the heavier particles that settle therein slide down upon the inclined plates into the path of the falling materials for further treatment.

What is claimed is:—

1. A classifier comprising in combination, an elongated casing supported in an upright position and constructed to form a treatment chamber, means for delivering the materials to be treated to the upper end of the chamber to pass downwardly therein, a blast conduit having discharge openings at spaced points lengthwise of the casing and formed to direct jets of air across the chamber, downwardly sloping plates mounted in the casing to divide the chamber into settling compartments disposed one above the other and the plates being arranged to direct the materials that settle in each compartment into the path of the next air jet, and means for exhausting air from the different compartments.

2. A classifier comprising in combination, an elongated casing supported in an upright position and provided with a material treatment chamber, means for delivering the materials to be treated into the upper portion of the chamber to pass downwardly therein, means for directing jets of air across the chamber at spaced points lengthwise of the casing, inclined plates mounted in the casing to divide the same into settling compartments disposed one above the other, said plates being arranged to direct the materials that settle upon the plates into the path of the air jets, means for exhausting air from the different compartments, and means operable independently of said air jet means for introducing rising air currents into the chamber adjacent the lower end of said plates to carry upwardly the lighter particles.

3. A classifier comprising in combination, a casing supported in an upright position and provided with a material treatment chamber, means for delivering the materials to be treated to the upper end of the chamber to pass downwardly therein, inclined plates mounted in the casing to divide the same into settling compartments disposed one above the other, said plates being arranged to direct the materials that settle therein into a predetermined path, means for exhausting air from the upper portion of the compartments, and means for introducing air into the casing at opposite sides of said path to produce air currents which serve to carry the lighter particles into the settling compartments and including air inlet conduits disposed at the opposite sides of said path.

4. A classifier comprising in combination, a casing supported in an upright position and provided with a material treatment chamber, means for delivering the materials to be treated to the upper end of the chamber to pass downwardly therein, inclined plates mounted in the casing to divide the same into settling compartments disposed one above the other, said plates being arranged to direct the materials that settle therein into a predetermined path, means for exhausting air from the upper portion of the compartments, blast means for directing jets of air across the path of the materials to carry them into the settling compartments, and means operable independently of said blast means for introducing air into the chamber adjacent the lower ends of said plates to pick up the lighter particles as the materials sliding down the plates reach the lower end thereof.

5. A classifier comprising in combination, an upright casing constructed to form a treatment chamber, means for introducing the materials to be treated into the upper portion of the chamber to move downwardly therein, a series of inclined plates mounted in the chamber to form settling compartments therein and arranged to direct the materials that settle in the different compartments against a wall of the casing to move downwardly along said wall, blast means for directing narrow blade-like jets of air against the materials traveling along said wall to blow them into the successive compartments for retreatment, and means for removing from the upper portion of the compartments the lighter particles that remain suspended in the air.

6. A classifier comprising in combination, an upright casing constructed to form a treatment chamber, means for introducing the materials to be treated into the upper part of the chamber to pass downwardly therein under the influence of gravity, blast means for directing jets of air across the path of the falling materials, suction means for extracting air from the chamber, independent adjustable means for regulating the volume of air introduced by the air blast and extracted by the suction means, an adjustable means for admitting air into the chamber from the atmosphere to control the air pressure therein.

7. A classifier comprising in combination, an upright casing constructed to form a treatment chamber, means for introducing the materials to be treated into the upper part of the chamber to pass downwardly therein under the influence of gravity, means for directing air across the path of the falling materials at a multiplicity of points throughout the length of the chamber, and a suction dust collector for extracting air from the chamber at various points along its length, comprising a casing extending lengthhwise of the treatment chamber and formed with a curved air passage constructed to impart a rotating movement to the air entering the casing to promote a centrifugal separation of the materials.

8. A classifier comprising in combination, a casing supported in an upright position and provided with a material treatment chamber, means for delivering the materials to be treated to the upper portion of the chamber to pass downwardly therein, inclined plate mounted in the casing to divide the same into settling compartments disposed one above the other and arranged to direct the material toward a predetermined path, means for exhausting air from the upper portion of the compartments, blast means for directing currents of air against the material traveling downward along said path, and air inlet conduits provided at the under face of the inclined plates for directing air into the chamber at the lower ends of the plates and constructed to confine the air within the conduits until the same reaches the lower end of the plates.

9. A classifier comprising in combination, a casing supported in an upright position and provided with a material treatment chamber, means for delivering the materials to be treated to the upper portion of the chamber to pass downwardly therein, inclined plates mounted in the casing to divide the same into settling compartments disposed one above the other and arranged to direct the material toward a predetermined path, means for exhausting air from the upper portion of the compartments, blast means for directing currents of air against the material traveling downward along said path, and means constructed to form a narrow inlet opening at the under side of each plate and through which air is introduced to pass upwardly through the materials moving downwardly at the end of the plates.

10. A classifier comprising in combination, an upright casing constructed to form a treatment chamber, means for introducing the materials to be treated into the upper part of the chamber to pass downwardly therein under the influence of gravity, means for directing air across the path of the falling materials at a multiplicity of points throughout the length of the chamber, and a suction dust collector for extracting air from the chamber at various points along its length, comprising a receptacle extending lengthwise of the treatment chamber and provided with means for directing the air exhausted from the casing into the receptacle with a rotative movement that promotes a centrifugal separation of the materials within the receptacle.

In testimony whereof, I have signed my name to this specification.

ALBERT H. STEBBINS.